US012139086B2

(12) United States Patent
Colgan-Smith et al.

(10) Patent No.: US 12,139,086 B2
(45) Date of Patent: Nov. 12, 2024

(54) VEHICLE BUMPER ASSEMBLY

(71) Applicant: ARB Corporation Limited, Kilsyth (AU)

(72) Inventors: Gavin Colgan-Smith, Kilsyth (AU); Robert Loane Dumaresq, Kilsyth (AU); John Desmond Clark, Kilsyth (AU); Andrew Harry Brown, Kilsyth (AU)

(73) Assignee: ARB CORPORATION LIMITED, Vic (AU)

( * ) Notice: Subject to any disclaimer, the term of this patent is extended or adjusted under 35 U.S.C. 154(b) by 177 days.

(21) Appl. No.: 17/884,001

(22) Filed: Aug. 9, 2022

(65) Prior Publication Data

US 2023/0069186 A1 Mar. 2, 2023

(30) Foreign Application Priority Data

Aug. 25, 2021 (AU) .................. 2021221773

(51) Int. Cl.
| | |
|---|---|
| *F21S 43/20* | (2018.01) |
| *B60Q 1/20* | (2006.01) |
| *B60R 19/50* | (2006.01) |
| *B60R 19/52* | (2006.01) |
| *F21W 102/30* | (2018.01) |
| *F21W 103/20* | (2018.01) |
| *F21W 103/55* | (2018.01) |

(52) U.S. Cl.
CPC ............... *B60R 19/50* (2013.01); *B60Q 1/20* (2013.01); *B60R 19/52* (2013.01); *F21S 43/26* (2018.01); *B60R 2019/505* (2013.01); *F21W 2102/30* (2018.01); *F21W 2103/20* (2018.01); *F21W 2103/55* (2018.01)

(58) Field of Classification Search
CPC ...... B60Q 1/0035; B60Q 1/20; B60Q 1/2607; B60Q 1/2661; B60Q 1/381; B60Q 2400/30; F21S 43/14; F21S 43/15; F21S 43/26; F21S 43/27; F21S 43/50
See application file for complete search history.

(56) References Cited

U.S. PATENT DOCUMENTS

| | | | |
|---|---|---|---|
| 6,883,945 B1 * | 4/2005 | Gonzalez ................. | B60Q 1/30 362/545 |
| 9,499,095 B1 * | 11/2016 | Buehler ................... | B60Q 1/26 |
| 11,300,266 B1 * | 4/2022 | Singh ..................... | F21S 43/195 |

(Continued)

FOREIGN PATENT DOCUMENTS

WO WO-2019177035 A1 * 9/2019 ........... B60Q 1/0023

*Primary Examiner* — Zheng Song
(74) *Attorney, Agent, or Firm* — Schwabe, Williamson & Wyatt, P.C.

(57) ABSTRACT

Vehicle bumper assembly including a bumper body, a pair of lamp modules and one or more controllers. The bumper body is configured to be arranged at least partially across one of a front and rear end of the vehicle (not illustrated). The body defines opposed sides. The pair of lamp modules are mounted to the bumper body to be spaced from each other and towards one of the sides. Each lamp module includes one or more light emitting units arranged to extend at least partially across the lamp module. The, or each, controller is configured to operate one or both of the lamp modules to cause the one or more light emitting units to sequentially illuminate to indicate a turn direction of the vehicle.

13 Claims, 7 Drawing Sheets

(56) References Cited

U.S. PATENT DOCUMENTS

| | | | |
|---|---|---|---|
| 11,433,837 B1* | 9/2022 | Rodgers | B60R 19/50 |
| 2015/0021937 A1* | 1/2015 | Perez | B60Q 1/0035 |
| | | | 29/401.1 |
| 2016/0347247 A1* | 12/2016 | Espey | E01F 9/662 |
| 2017/0297480 A1* | 10/2017 | Elwell | F21S 43/19 |
| 2017/0334347 A1* | 11/2017 | Wilkins | B60R 9/06 |
| 2018/0304838 A1* | 10/2018 | Cummings | B60R 19/02 |
| 2019/0078744 A1* | 3/2019 | Shin | F21S 41/16 |
| 2019/0126809 A1* | 5/2019 | Wymore | B60R 19/50 |
| 2021/0095830 A1* | 4/2021 | Hansen | F21S 43/26 |
| 2023/0219494 A1* | 7/2023 | Schaye | B60Q 1/28 |
| | | | 340/467 |

\* cited by examiner

VEHICLE BUMPER ASSEMBLY

CROSS-REFERENCE TO RELATED APPLICATION(S)

This application claims priority to Australian patent application no. 2021221773, filed on Aug. 25, 2021, the entirety of which is incorporated by reference herein.

TECHNICAL FIELD

The present disclosure relates generally to vehicle bumper assemblies including one or more lamp modules, and particularly to aftermarket bumper assemblies for retro-fitting to a vehicle and including direction indicator lamps.

BACKGROUND

Many passenger vehicles include complex headlamp and tail lamp light clusters or modules mounted at each corner of the vehicle, typically above the front and rear bumpers. Lamp modules typically include a plurality of lamps intended to provide different illumination functions, usually including forward or rearward illumination and a direction indicator (also referred to as a turn signal or "blinker"). For example, a headlamp unit commonly includes a main beam lamp, a high beam lamp, and a direction indicator lamp. It is also commonplace for vehicles to include lamp modules mounted in the front and/or rear bumper. Such modules are typically to provide a fog light and/or reverse light.

Many owners of vehicles capable of off-road driving (commonly known as four wheel drive, "4WD", or "4×4" vehicles) choose to replace the standard/factory front bumper of the vehicle with an aftermarket motor vehicle frontal protection system, common known as a "bull bar" bumper (also known as a "bullbar", "push bumper", "push bar", "roo bar", "nudge bar", "moose bumper", or "grille guard") to enhance durability of the front end of the vehicle. Bull bars are typically rigid metallic structures designed to withstand multiple and/or significant impacts, for example, due to colliding with animals, rocks, trees, or the like, particularly when driving off-road. Bull bars commonly have tubular members arranged in-front of, or about, the headlamps of the vehicle to protect the lamp covers from damage. The tubular members are fixed to a main body which extends from the front of the vehicle, typically further than the factory bumper. The structure of a bull bar can therefore partially cover, or otherwise obscure, the vehicle's headlamp modules, which can affect illuminating the road and/or inhibit the direction indicator lamps being seen by other drivers, both of which can affect safety of the driver. Also, fitting a bull bar to the vehicle may cause lamp modules mounted to the factory bumper to be removed, such as fog lamp modules, which can also degrade vehicle lighting.

Any discussion of documents, acts, materials, devices, articles or the like which has been included in the present specification is not to be taken as an admission that any or all of these matters were common general knowledge in the field relevant to the present disclosure as it existed before the priority date of each of the appended claims.

SUMMARY

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

According to some disclosed embodiments, there is provided a vehicle bumper assembly including a bumper body configured to be arranged at least partially across one of a front and rear end of the vehicle, the bumper body defining opposed sides, a pair of lamp modules mounted to the bumper body to be spaced from each other and towards one of the sides, each lamp module including one or more light emitting units arranged to extend at least partially across the lamp module, and a controller configured to operate one or both of the lamp modules to cause the one or more light emitting units to sequentially illuminate to indicate a turn direction of the vehicle.

The bumper body may have a central portion between the opposed sides, and the controller may be configured to operate one or both of the lamp modules to cause the one or more light emitting units to initially illuminate a first location arranged proximally to the central portion, and then cause the one or more of the light emitting units to sequentially illuminate further locations which are spaced from the first location and towards one of the sides of the bumper body. The controller may operate the one or more light emitting units in this way to provide a visual impression of illumination increasing in a direction towards one of the sides of the bumper body. The increasing illumination may be indexed, to provide a staged illumination of the locations, or may be substantially continuous such that it appears the illumination moves smoothly and/or expands or grows towards the side.

The controller may be configured to operate one or both of the lamp modules to cause the one or more light emitting units to sequentially and progressively illuminate locations across the lamp module.

Each lamp module may include an array of light emitting units arranged to be at least partially linear, and include a lens shaped to cover the array of light emitting units.

Each lamp module may include a diffuser arranged between the array of light emitting units and the lens to receive light emitted from the light emitting units, and the diffuser have a front side defining a plurality of distinct light emitting portions.

Each light emitting portion may define at least one of faceted and non-planar geometry.

The light emitting portions may be arranged to form a saw-tooth shaped front face.

The diffuser may have a rear side arranged adjacent the light emitting units and define a plurality of distinct light receiving portions.

Each light emitting portion may define at least one of faceted and non-planar geometry.

Each light receiving portion may be arranged to generally extend at an angle relative to one of the light emitting units.

Each light emitting portion may be arranged opposite and at an opposed angle to one of the light receiving portions.

Each light emitting portion may be arranged at a mirrored angle to the angle of the associated light receiving portion.

Each light receiving portion may define two notional receiving planes arranged at an angle to each other to form a peak, and each peak be arranged towards one of the light emitting units.

Each light emitting portion may define two notional emitting planes arranged at an angle to each other.

Each lamp module may be configured as a cluster including one or more of a fog light unit, and a daytime running light unit. The daytime running light unit may be integrated with the one or more light emitting units described above to provide a dual lighting function sub-module.

The body may include a grille structure and each lamp module may include a grille portion shaped and arranged to be complementary to the grille structure.

The bumper body may be configured to be retro-fitted to a vehicle.

The assembly may be configured as a motor vehicle frontal protection system, otherwise known as a bull bar. In such embodiments, the bumper body may comprise a substantially rigid structure configured to withstand impact.

It will be appreciated embodiments may comprise steps, features and/or integers disclosed herein or indicated in the specification of this application individually or collectively, and any and all combinations of two or more of said steps or features.

BRIEF DESCRIPTION OF DRAWINGS

Embodiments will now be described by way of example only with reference to the accompany drawings in which.

DESCRIPTION OF EMBODIMENTS

Figure 1:
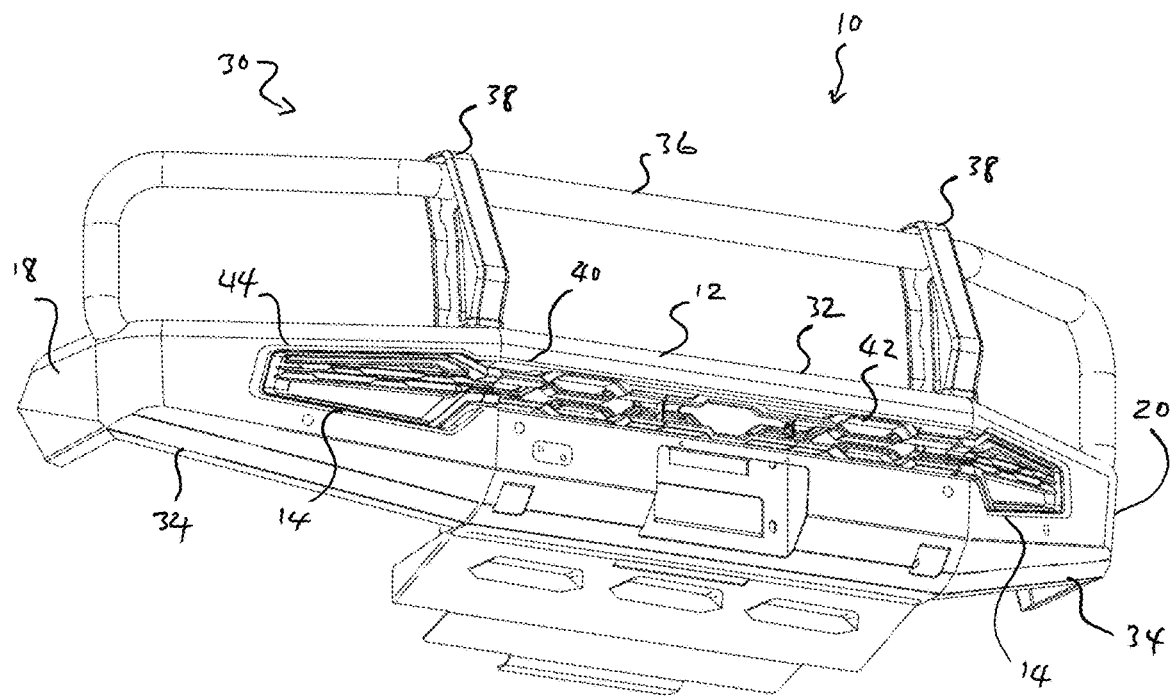
FIG. 1 is a perspective view of a vehicle bumper assembly.

In the drawings, reference numeral 10 generally designates a vehicle bumper assembly 10 including a bumper body 12, a pair of lamp modules 14 and one or more controllers 16. The bumper body 12 is configured to be arranged at least partially across one of a front and rear end of the vehicle (not illustrated). The body 12 defines opposed sides 18, 20. The pair of lamp modules 14 are mounted to the bumper body 12 to be spaced from each other and towards one of the sides 18, 20. Each lamp module 14 includes one or more light emitting units 22 arranged to extend at least partially across the lamp module 14. The, or each, controller 16 is configured to operate one or both of the lamp modules 14 to cause the one or more light emitting units 22 to sequentially illuminate to indicate a turn direction of the vehicle.

The illustrated embodiment of the bumper assembly 10 is in the form of a motor vehicle frontal protection system 30, also referred to as a "bull bar" assembly 30, configured to be retro-fitted to a vehicle to replace the standard (factory) front bumper. It will be appreciated that, in other embodiments (not illustrated), the bumper assembly 10 is configurable as a rear bumper, step and/or tow bar assembly which is retro-fittable to a rear of the vehicle. The assembly 10 is alternatively configurable as a conventional bumper, having a deformable bumper body, for replacing a factory bumper, such as may be provided as part of a body or styling kit.

Throughout this specification, reference is made to lamp modules 14. It will be appreciated that such modules 14 include any suitable lamp unit mountable to the bumper body 12, including simple, single lamp units, to complex, multi-lamp clusters.

Figure 2:
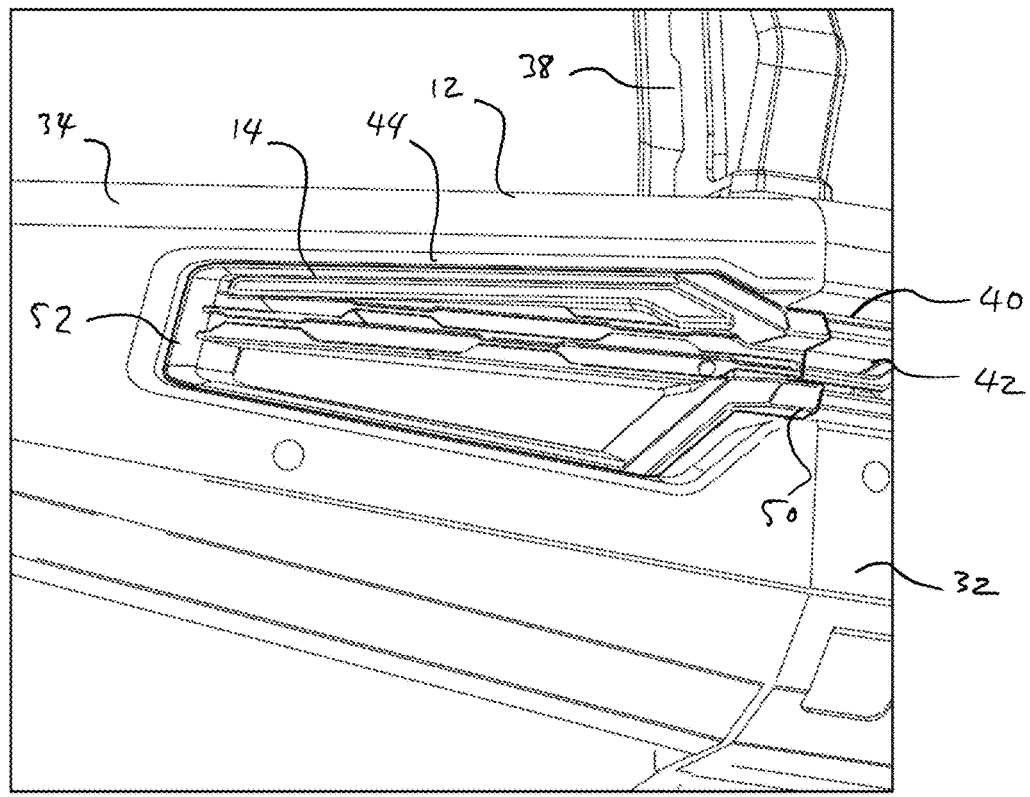
FIG. 2 is a detailed view of a lamp module of the bumper assembly shown in FIG. 1.

FIGS. 1 and 2 show the bull bar assembly 30 in perspective and detailed views. The assembly 30 is intended to replace the factory front bumper of the vehicle and shaped to be arranged across, and mounted to, the front end of the vehicle.

The assembly 30 includes the bumper body 12 configured as a substantially rigid structure, typically being manufactured from formed and/or rolled sheet metal. In other embodiments (not illustrated), the bumper body 12 is configured as a resiliently deformable structure, typically manufactured by rotational moulding. The body 12 includes a central portion 32 interposed between a pair of wing portions 34, each shaped to closely follow the profile of the vehicle model the assembly 30 is configured to be fitted to. A bar 36 extends between the wing portions 34 and is supported above the body 12 by a pair of brace structures 38 fixed to the body 12. The bar 36 is shaped to, in use, substantially encircle the headlamps and grille of the vehicle. It will be appreciated that the form of the illustrated bumper body 12 is exemplary and that the body 12 is configurable to define other forms. For example, the brace structures 38 may be absent and the bar 36 be arranged to surround only the grille of the vehicle.

The central portion 32 defines an aperture, in the form of a slot 40, in which a grille structure 42 is arranged. The grille 42 is shaped to define a generally open, honeycomb-like structure to allow air to flow past the grille 42 and into the engine bay of the vehicle. Best shown in FIG. 2, each wing portion 34 defines a lamp aperture 44 aligned with the slot 40 and shaped to receive one of the lamp modules 14.

FIGS. 3 to 6 illustrate the lamp module 14 in isolation. Each lamp module 14 has an operatively inner side 50 configured to be arranged adjacent to the central portion 32 and grille 42, and has an opposed operatively outer side 52. Best shown in FIG. 2, the inner side 50 defines a tapered portion shaped to align with the slot 40 and grille 42. A grille portion 54 shaped and arranged to be complementary to the grille structure 42, in this embodiment defining a complementary honeycomb-like structure, extends across the front face of the lamp module 14. This arrangement may enhance visual cohesion between the lamp module 14 and bumper body 12.

Figure 4:
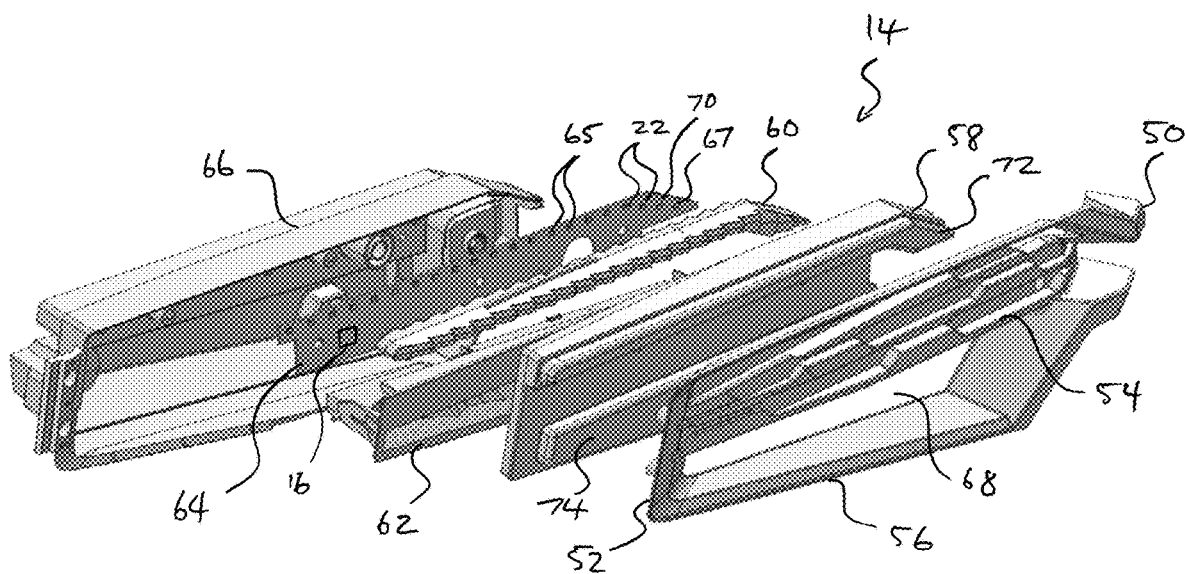
FIG. 4 is an exploded perspective view of the lamp module shown in FIG. 3.

FIG. 4 shows an exploded view of the components of the lamp module 14. The module 14 includes a fascia 56, a lens 58, a diffuser 60, a reflector 62, a printed circuit board (PCB) 64 carrying the one or more light emitting units 22, in this embodiment 30 in the form of an array of a plurality of light emitting diode units (LEDs) 65, and a housing 66. In this illustrated embodiment, each LED unit 65 comprises a plurality of LEDs, including an amber coloured LED which is operable to provide the direction indicator function, and a white LED which is operable to provide a forward illumination function. It will be appreciated that each LED unit 65 is configurable to have more, or less, LEDs, and that operating combination of LEDs allow transmitting different frequencies and/or intensities of light, such as to affect colour.

The fascia 56 and housing 66 are typically in the form of plastic mouldings. The fascia 56 defines the grille portion 54 and apertures 68 arranged to reveal parts of the lens 58. The housing 66 is securable to the fascia 56, typically with fasteners, such as screws, to retain the other components together to form the module 14.

In some embodiments (not illustrated), the one or more light emitting units 22 include an organic light-emitting diode (OLED) layer. The OLED layer is typically configured as a strip carried by the PCB 64 to extend at least partially across the lamp unit 14. In the illustrated embodiment, the array of LEDs 65 are discrete units directly mounted to the PCB 64, which also carries other electrical components and wiring. In yet other embodiments (not illustrated), the PCB 64 is manufactured according to a "chip on board" (COB) approach such that the electrical components, including the LEDs 65, are bonded directly to the PCB 64 and covered by one or more settable materials, such as epoxy or silicone.

In the illustrated embodiment, the PCB 64 of each lamp module 14 carries a controller 16, in the form of a microprocessor, such that each module 14 has its own controller 16. In other embodiments (not illustrated), the controller 16 is arranged remotely to the light modules 14, such as being arranged elsewhere in, or on, the bumper body 12. In some embodiments (not illustrated), the controller 16 is arranged remotely from the lamp modules 14 and bumper body 12, such as being configured as a software application executable by a computing device, such as a smartphone, or other digital system carried by the vehicle. In such embodiments, a single controller 16 may be provided to control operation of both modules 14 by wired or wireless communication, such as according to the Bluetooth radio frequency communication standard.

Figure 5:
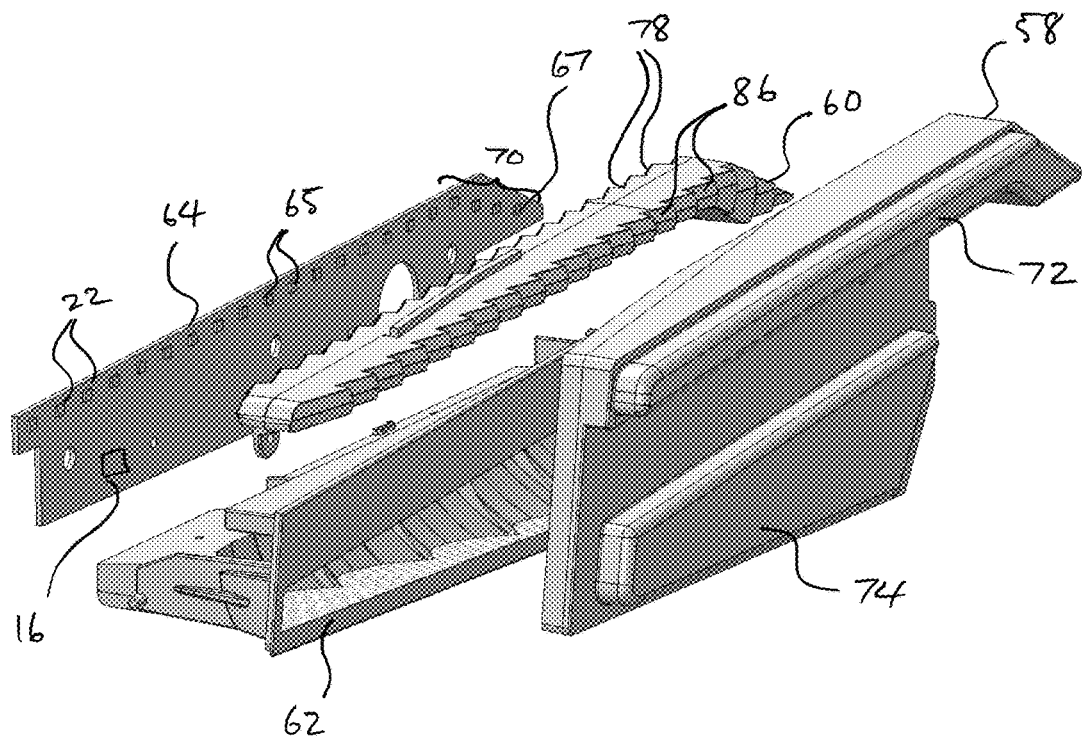
FIG. 5 is a simplified exploded perspective view of the lamp module shown in FIGS. 3 and 4.

FIG. 5 illustrates a simplified exploded view with the housing 66 and fascia 56 hidden. This shows the arrangement of the array of LEDs 65 across the PCB 64. The array is arranged to be substantially linear to extend across the module 14 and has an angled portion 70 arranged to follow a front profile of the lens 58. It will be appreciated that, in other embodiments (not illustrated), the array may define a curved profile, or a combination of linear and curved shapes.

In the illustrated embodiment, each light module 14 is configured as a light cluster which also includes a fog light unit (not visible) arranged adjacent the reflector 62. The light module also provides a daytime running light unit function by the controller 16 being configured to operate all of the white LEDs 65 simultaneously. When the fog light unit is operated, the illuminated light is transmitted operatively forwards by reflecting off the reflector 62. When configured in this way, the lamp module 14 may provide multiple lighting functions, such as enhanced illumination in foggy or misty conditions. In less complex embodiments (not illustrated), the fog light unit and/or daytime running light unit functionality, and the reflector 62 may be absent, so that the lamp module 14 only provides a direction indicator function.

The lens 58 is typically in the form of a transparent plastic moulding. At least some of the lens 58 may be coloured, such as being formed from a translucent material and/or carry pigment, to allow colouring light transmitted through the lens 58.

Figure 3:
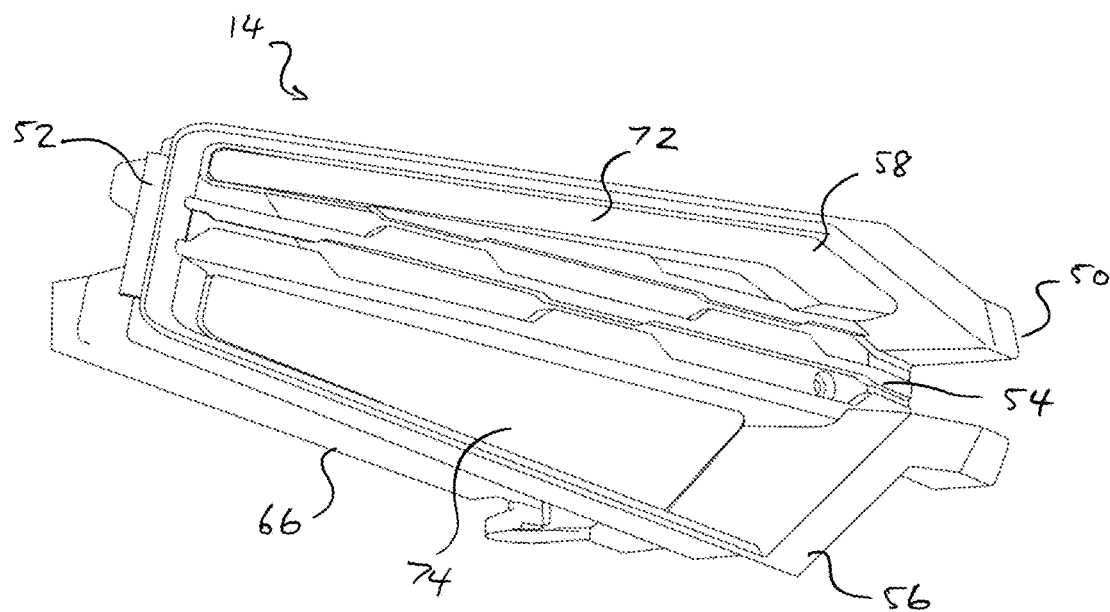
FIG. 3 is a perspective view of the lamp module shown in FIG. 2 in isolation.
Figure 6:
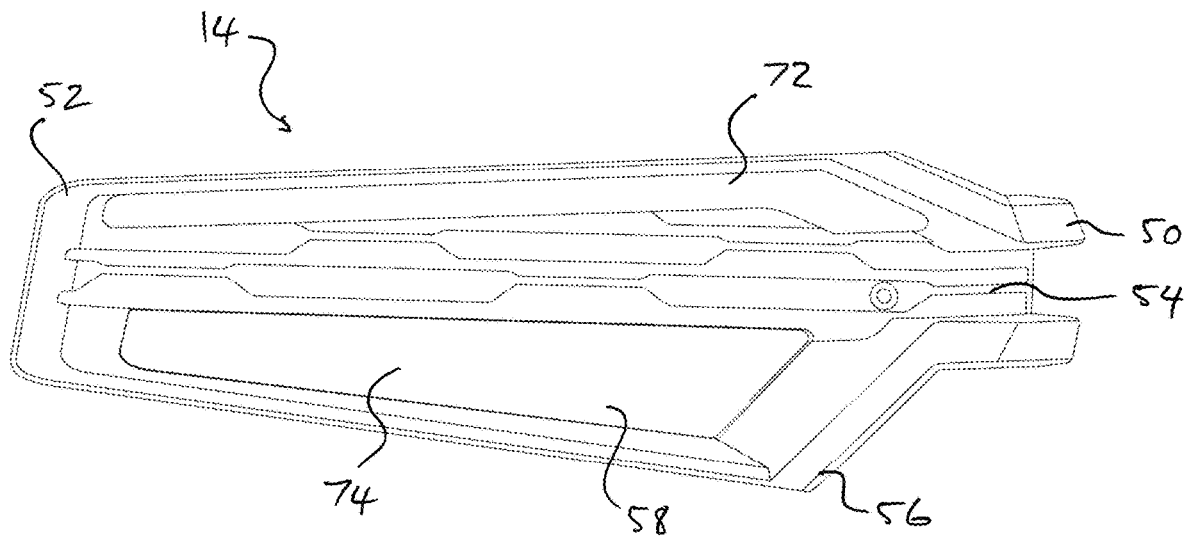
FIG. 6 is a front view of the lamp module shown in FIG. 3.

Best shown in FIGS. 3 and 6, the lens 58 defines an indicator portion 72 shaped to cover the entire array of LEDs 65, and a reflector portion 74 shaped to cover the reflector 62. The indicator portion 72 is typically configured as a hollow shell shaped to at least partially receive the diffuser 60. When configured in this way, the recess for receiving the diffuser 60 may define shaped and/or textured sidewalls, such as being ribbed, to enhance directing light from the LEDs 65 and through the lens 58.

Figure 7:
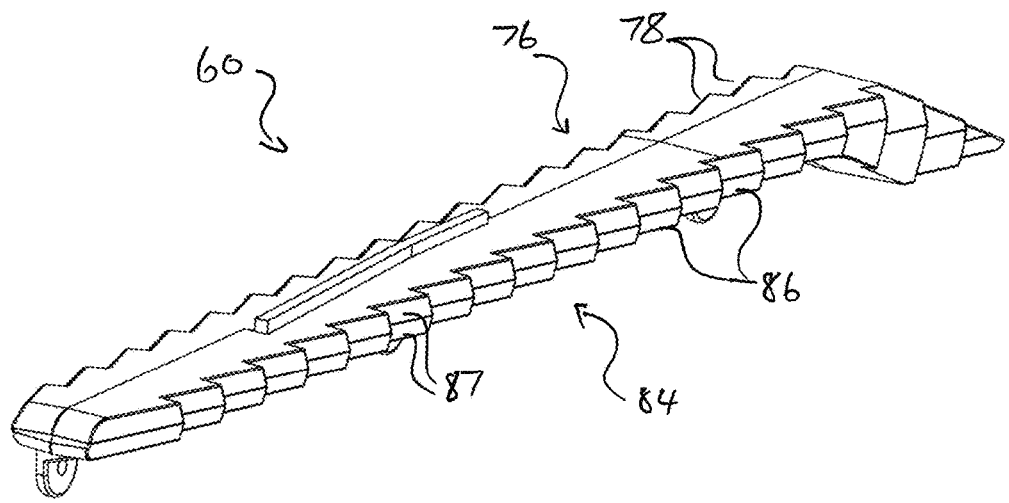
FIGS. 7 and 8 are front and rear perspective views, respectively, of a diffuser of the lamp module shown in the previous figures.
Figure 8:
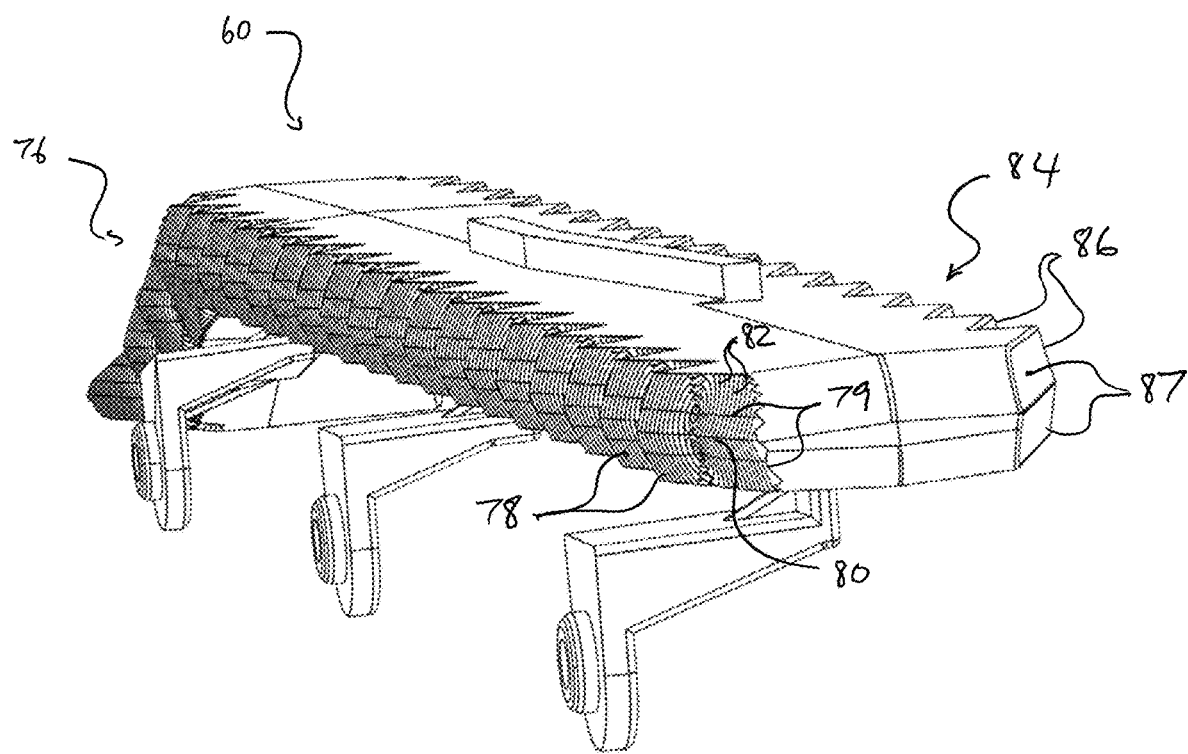

FIGS. 7 and 8 show the diffuser 60 in isolation. The diffuser 60 has a faceted front side 84 defining a plurality of distinct light emitting portions 86. In the illustrated embodiment, each light emitting portion 86 defines two non-parallel planes 87, and the light emitting portions 86 are arranged to form a saw-tooth shaped front side 84. This segmented arrangement of the front face 84 of the diffuser 60 allows light conveyed from the LEDs 65 and through the diffuser 60 to be transmitted from one or more of the distinct light emitting portions 86. This can allow a staged, progressive illumination of the indicator portion 72 of the lens 58, as described in greater detail below. It will be appreciated that, in other embodiment (not illustrated), the light emitting portions 86 are alternatively configured to define a segmented front side 84 from other structures, such as including one or more of single curved surfaces, double curved surfaces, domes, and other facets.

The diffuser 60 has a rear side 76 defining a plurality of distinct light receiving portions 78. Each light receiving portion 78 is arranged to be adjacent, and at an angle relative to, one of the LEDs 65. Best shown in FIG. 8, in the illustrated embodiment, each light receiving portion 78 defines two notional planes 79 arranged at an angle to each other to form a peak 80 arranged towards one of the LEDs 65 so that, in use, the peak 80 extends horizontally across the LED 65. Each light receiving portion 78 is profiled to enhance receiving light from the LEDs 65, in the illustrated embodiment, defining an array of curved ribs 82.

The light receiving portions 78 are arranged to form a saw-tooth shaped rear side 76. Each light emitting portion 86 is associated with, and arranged opposite to, one of the light receiving portions 78 to be at an opposed angle. In the illustrated embodiment, each light emitting portion 86 is arranged at a mirrored angle to the angle of the associated light receiving portion 78.

The controller 16 is programmed to operate one, or both of, the lamp modules 14 to cause sequential illumination of the one or more light emitting units 22, in the illustrated embodiment being the LEDs 65, to indicate a turn direction, being that the vehicle is turning left or right. Configuring the controller 16 in this way may allow creating a range of lighting effects to communicate direction through operation of the one or more light emitting units 22. For example, the controller 16 may be configured to operate the one or more light emitting units 22 to illuminate locations spaced across the lamp module 14 in a sequence, one at a time, starting at a first location arranged proximally to the central portion 32 and then other locations spaced from the first location and towards one of the sides 18, 20 of the bumper body 12. Alternatively, the controller 16 may be configured to operate the one or more light emitting units 22 in a sequence such that illumination progressively expands across the lamp module 14, typically in a linear, or partially linear, manner. Further alternatively, the controller 16 may be configured to initially operate the one or more light emitting units 22 to illuminate across the lamp module 14 and then progressively deactivate the one or more light emitting units 22 to cause a gradual, linear dimming across the lamp module 14. Additionally or alternatively, the controller 16 may be configured to operate the one or more light emitting units 22 to pulse light at one or more frequencies.

Best shown to FIGS. 4 and 5, in the illustrated embodiment 30, the array of LEDs 65 has a first LED 67 arranged closest to the inner side 50 of the lamp module 14. When mounted to the bumper body 12, the first LED 67 is closest to the central portion 32 of the bumper body 12. In this embodiment, the controller 16 is configured to initially operate the first LED 67 to cause this to illuminate, and then operate one or more of the LEDs 65 spaced from the first LED 67 to cause the one or more LEDs 65 to sequentially illuminate. This may involve operating all of the LEDs 65 in the array, one after the other, to provide the appearance of light travelling from the inner side 50 to the outer side 52 of the module 14.

Figure 9:
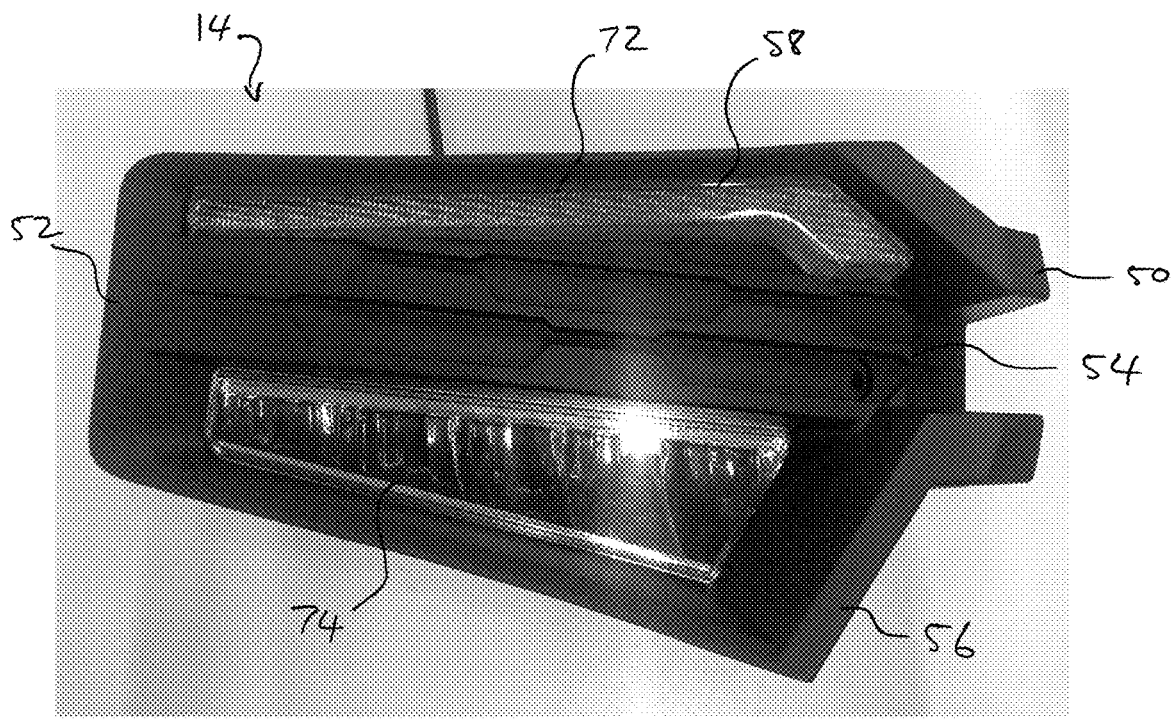
FIGS. 9 to 13 are front views of the lamp module shown in the previous figures, illustrating various stages of operation to indicate a turn direction.
Figure 10:
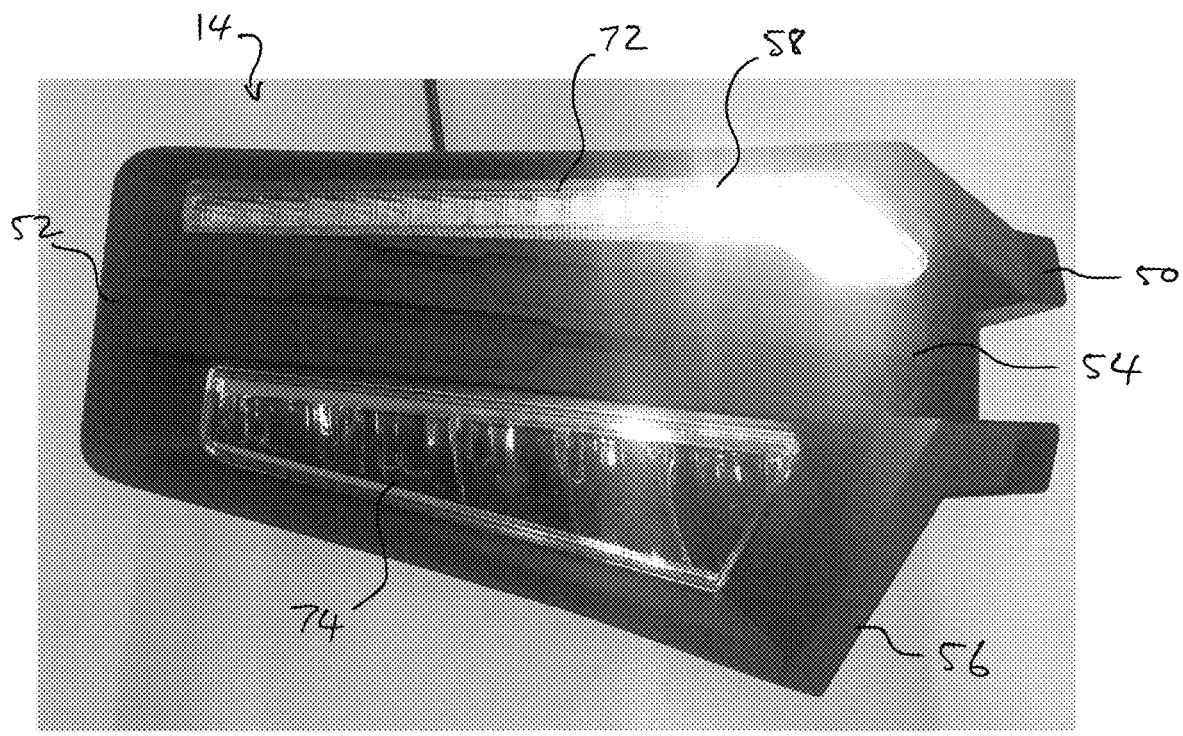
Figure 11:
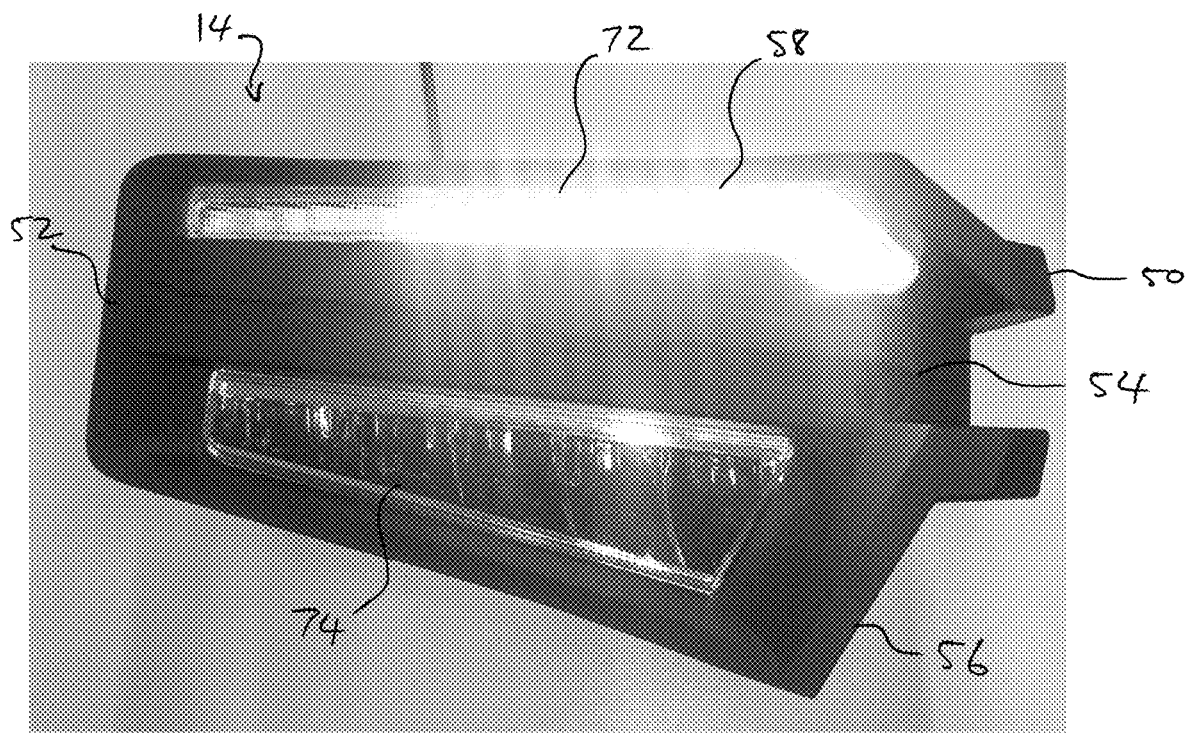
Figure 12:
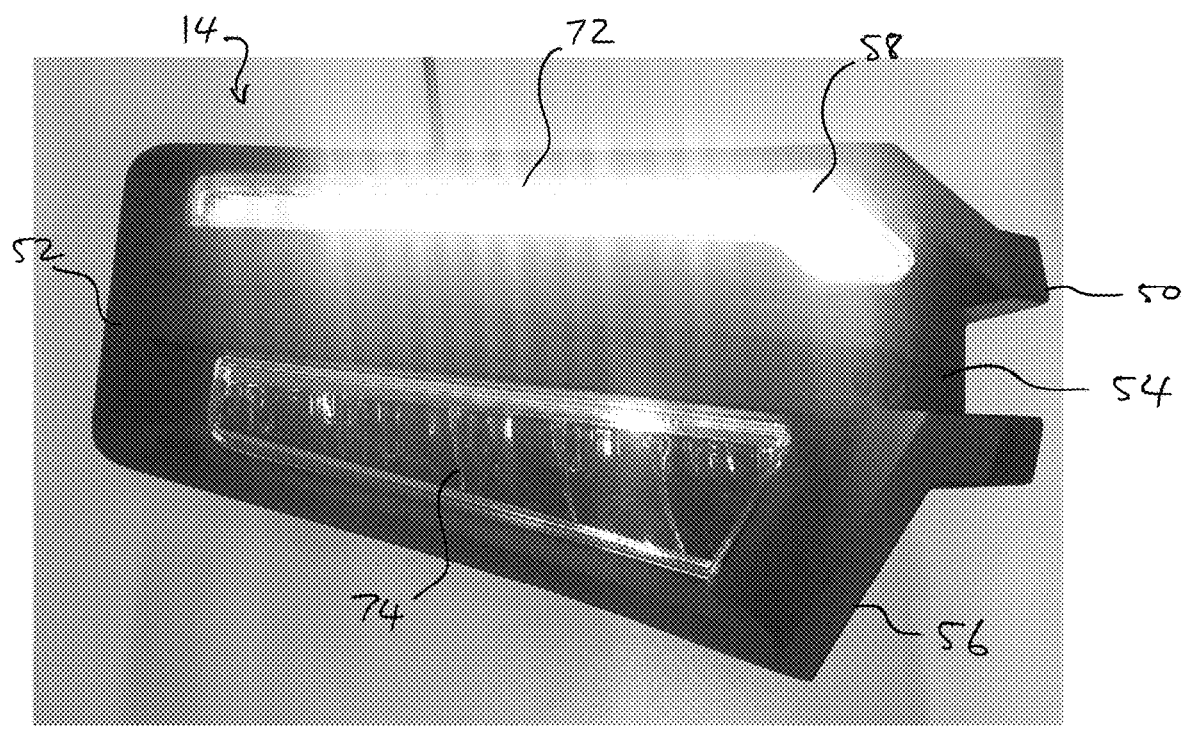
Figure 13:
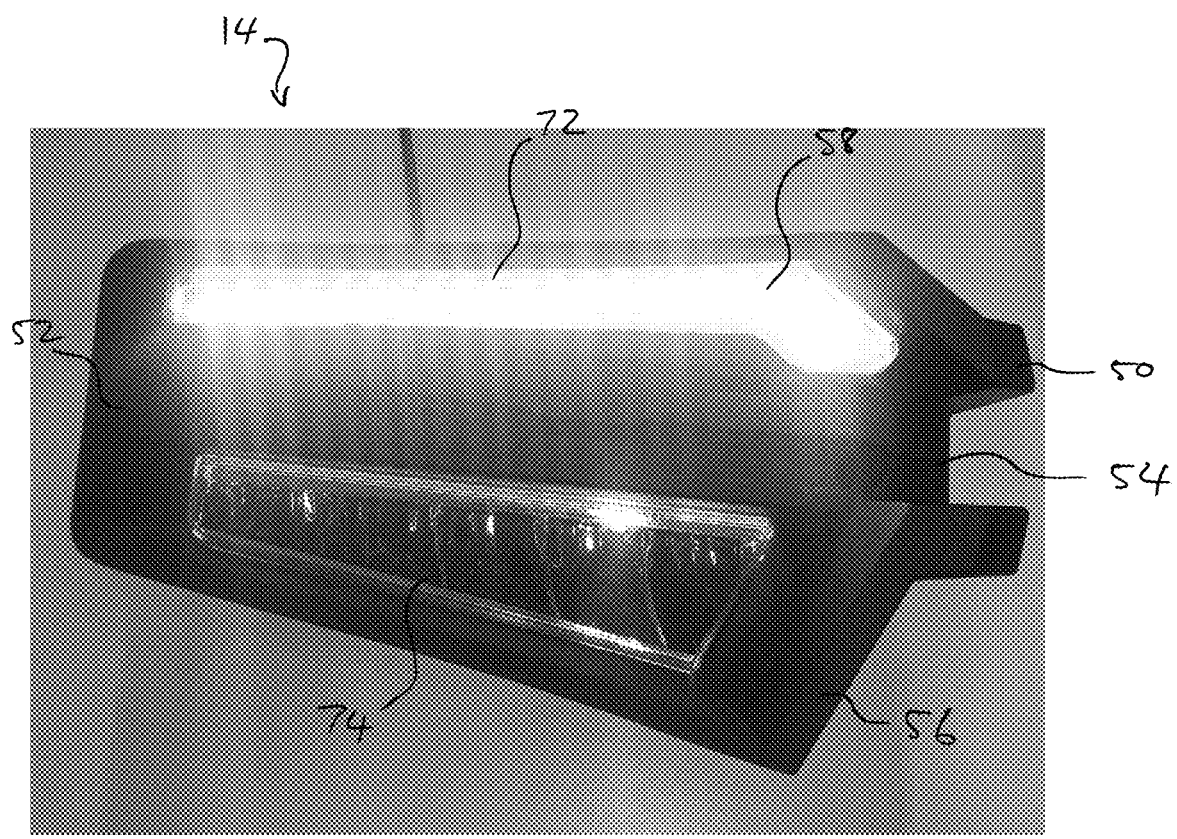

FIGS. 9 to 13 illustrate the lamp module 14 in one mode of operation to provide a direction indication, or turn signal, to other drivers. FIG. 9 shows the lamp module 14 in an inoperative state, where none of the LEDs 65 are illuminated meaning that the indicator portion 72 of the lens 60 is dark. FIG. 10 shows the start of emitting the direction indication by the controller 16 operating the first LED 67 and some adjacent LEDs 65 to cause these LEDs 65, 67 to be illuminated. FIGS. 11 and 12 show the illumination increasing across the array as a result of the controller 16 operating additional LEDs 65 adjacent the previously illuminated LEDs 65. FIG. 13 shows the final stage of emitting the direction indication where all of the LEDs 65 are being operated by the controller 16. Once all of the LEDs 65 are illuminated, the controller 16 may be configured to deactivate all of the LEDs 65 and then repeat the sequence.

It will be appreciated that the controller 16 may be configured such that the sequential and progressive illumination of the LEDs 65 from one end of the array to the other, as illustrated in FIGS. 9 to 12, may occur quickly, such as within 1 second. This may give the impression to other drivers of a growing pulse of light extending operatively outwards, i.e. towards the left or right of the vehicle, depending on which light module 14 is being operated, which would be understood as indicating a turn direction of the vehicle.

It will also be appreciated that the mode of operation illustrated in FIGS. 9 to 13 is exemplary only and that the controller 16 is configurable to operate the LEDs 65 according to other sequences to communicate a turn direction of the vehicle to other drivers. For example, the controller 16 may be configured to successively operate the LEDs 65, one at a time, or a group of LEDs 65 at a time, to provide the impression of a pulse or ball of light moving across the lens 60.

The disclosed assembly 10 provides a vehicle bumper 10 which has lamp modules 14 which allow sequentially illuminating the one or more light emitting units 22 arranged at least partially across each lamp module 14 to indicate a turn direction of the vehicle. This may enhance safety of the driver by providing direction indicators, in addition to those integrated in the vehicle, to clearly indicate to other drivers which direction the vehicle is turning. The lamp modules 14 may be arranged such that the visibility of the lamp modules 14 by other drivers is better than visibility of the integrated direction indicators. Also, where the vehicle's integrated headlamps may be partially covered or otherwise obscured by the bumper body 12, the illumination of the lamp modules 14 in this way may complement any loss in direction indicator functionality and enhance communicating the turn direction to other drivers.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A vehicle bumper assembly including:
   a bumper body configured to be arranged at least partially across one of a front and rear end of the vehicle, the bumper body defining opposed sides;
   a pair of lamp modules mounted to the bumper body to be spaced from each other and towards one of the sides, each lamp module including one or more light emitting units arranged to extend at least partially across the lamp module; and
   a controller configured to operate one or both of the lamp modules to cause the one or more light emitting units to sequentially illuminate to indicate a turn direction of the vehicle,
   wherein each lamp module includes an array of light emitting units arranged to be at least partially linear, a lens shaped to cover the array of light emitting units, and a diffuser arranged between the array of light emitting units and the lens to receive light emitted from the light emitting units, the diffuser having a front side defining a plurality of distinct light emitting portions and a rear side arranged adjacent the light emitting units and defining a plurality of distinct light receiving portions, wherein each light emitting portion defines at least one of faceted and non-planar geometry.

2. The assembly of claim 1, wherein the bumper body has a central portion between the opposed sides, and wherein the controller is configured to operate one or both of the lamp modules to cause the one or more light emitting units to initially illuminate a first location arranged proximally to the central portion, and then cause the one or more of the light emitting units to sequentially illuminate locations spaced from the first location and towards one of the sides.

3. The assembly of claim 1, wherein the controller is configured to operate one or both of the lamp modules to cause the one or more light emitting units to sequentially and progressively illuminate locations across the lamp module.

4. The assembly of claim 1, wherein the light emitting portions are arranged to form a saw-tooth shaped front face.

5. The assembly of claim 1, wherein each light receiving portion is arranged to generally extend at an angle relative to one of the light emitting units.

6. The assembly of claim 5, wherein each light emitting portion is arranged opposite and at an opposed angle to one of the light receiving portions.

7. The assembly of claim 6, wherein each light emitting portion is arranged at a mirrored angle to the angle of the associated light receiving portion.

8. The assembly of claim 1, wherein each light receiving portion defines two notional receiving planes arranged at an angle to each other to form a peak, and each peak is arranged towards one of the light emitting units.

9. The assembly of claim 1, wherein each light emitting portion defines two notional emitting planes arranged at an angle to each other.

10. The assembly of claim 1, wherein each lamp module is configured as a cluster including one or more of a fog light unit, and a daytime running light unit.

11. The assembly of claim 1, wherein the body includes a grille structure and each lamp module includes a grille portion shaped and arranged to be complementary to the grille structure.

12. The assembly of claim 1, wherein the bumper body is configured to be retro-fitted to a vehicle.

13. The assembly of claim 12 configured as a motor vehicle frontal protection system and wherein the bumper body comprises a substantially rigid structure configured to withstand impact.

\* \* \* \* \*